US008295291B1

(12) United States Patent
Ramanathan et al.

(10) Patent No.: US 8,295,291 B1
(45) Date of Patent: Oct. 23, 2012

(54) COMPUTATION OF NEXT HOPS WITHIN LAYER TWO NETWORKS

(75) Inventors: Ramasamy Ramanathan, Santa Clara, CA (US); Apurva Mehta, Cupertino, CA (US); Rama Ramakrishnan, San Jose, CA (US); Gopi Krishna, Tracy, CA (US); Srinivasa Chaganti, San Ramon, CA (US); Krishna Sankaran, Milpitas, CA (US); Jagadish Grandhi, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 490 days.

(21) Appl. No.: 12/643,849

(22) Filed: Dec. 21, 2009

(51) Int. Cl.
*H04L 12/28* (2006.01)
(52) U.S. Cl. .................... 370/400; 709/238
(58) Field of Classification Search .............. None
See application file for complete search history.

(56) References Cited

U.S. PATENT DOCUMENTS

| 7,701,940 | B2* | 4/2010 | Novello et al. ............. 370/390 |
| 2006/0268747 | A1* | 11/2006 | van Haalen et al. .......... 370/256 |
| 2007/0118595 | A1* | 5/2007 | Jain et al. ................. 709/203 |
| 2010/0110934 | A1* | 5/2010 | Li et al. ................... 370/256 |
| 2010/0246388 | A1* | 9/2010 | Gupta et al. ............... 370/225 |
| 2010/0284309 | A1* | 11/2010 | Allan et al. ................ 370/256 |
| 2010/0309912 | A1* | 12/2010 | Mehta et al. ............... 370/390 |
| 2011/0080854 | A1* | 4/2011 | Farkas et al. .............. 370/256 |

OTHER PUBLICATIONS

ANSI/IEEE Std 802.1D, LAN/MAN Standards Committee of the IEEE Computer Society, ed. 1990, Dec. 1990, 28 pp.
ANSI/IEEE Std 802.1D—2004: IEEE Standard for Local and Metropolitan Area Networks: Media Access Control (MAC) Bridges, LAN/MAN Standards Committee of the IEEE Computer Society, ed. 2004, Jun. 2004, 260 pp.

* cited by examiner

*Primary Examiner* — Hassan Kizou
*Assistant Examiner* — Roberta A Shand
(74) *Attorney, Agent, or Firm* — Shumaker & Sieffert, P.A.

(57) ABSTRACT

A device includes one or more network interfaces to receive layer two (L2) communications from an L2 network having a plurality of L2 devices; and a control unit to forward the L2 communications in accordance with forwarding information defining a plurality of flooding next hops. Each of the flooding next hops stored by the control unit specifies a set of the L2 devices within the L2 network to which to forward L2 communications in accordance with a plurality of trees, where each of the trees has a different one of the plurality of L2 devices as a root node. The control unit of the device computes a corresponding one of flooding next hops for each of the trees using only a subset of the trees without computing all of the trees having all of the different L2 network devices as root nodes.

17 Claims, 6 Drawing Sheets

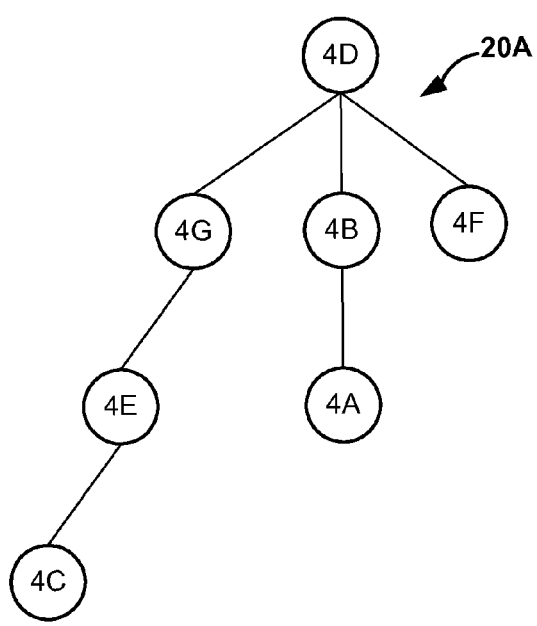
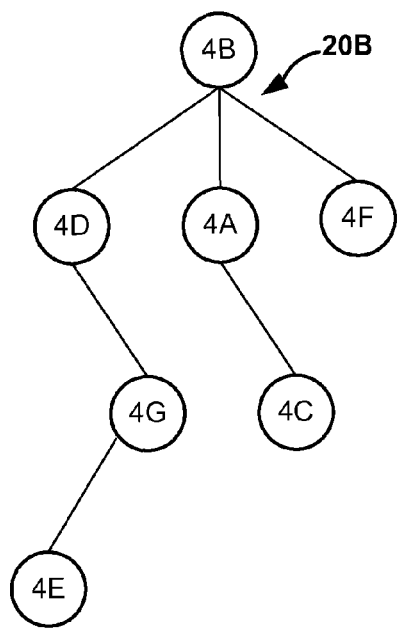
FIG. 4A  FIG. 4B
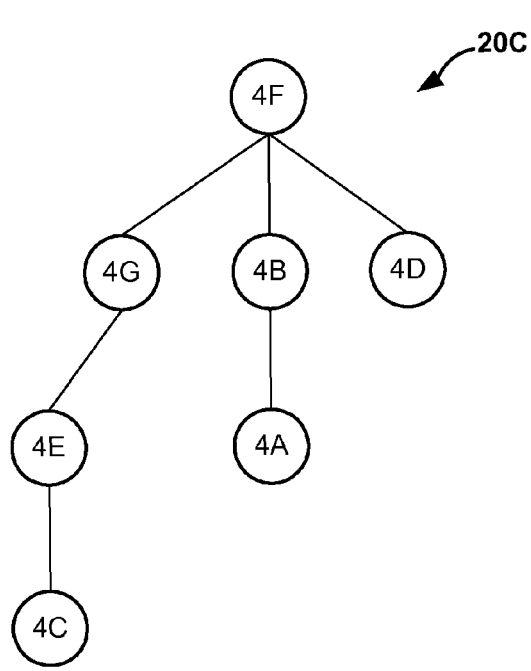
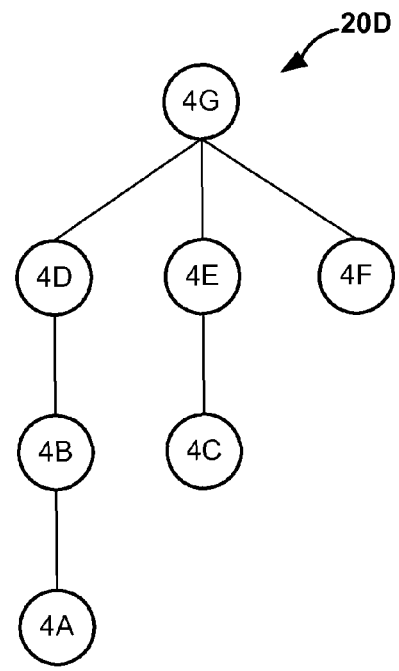
FIG. 4C  FIG. 4D

COMPUTATION OF NEXT HOPS WITHIN LAYER TWO NETWORKS

TECHNICAL FIELD

The invention relates to computer networks and, more particularly, to forwarding communications within computer network.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a data link layer device is a customer premises equipment (CPE) device, such as a switch, modem, Ethernet card, or wireless access point. Traditional L2 networks include Ethernet networks, Asynchronous Transfer Mode (ATM) networks, Frame Relay networks, networks using High Level Data Link Control (HDLC), Point-to-Point (PPP) connections, PPP sessions from Layer 2 Tunneling Protocol (L2TP) tunnels, and Virtual Local Area Networks (VLANs).

In L2 networks, an L2 device responsible for forwarding network traffic, such as an L2 switch or an L2-enabled router, operates to "flood" (i.e., forward a copy of) network traffic to a set of output ports of the device in a situation where the network traffic is destined for a network address that has not previously been seen, and therefore not learned, by the device. In this manner the L2 device can ensure that at least the destination receives the network traffic regardless of the destination's location within the L2 network. The L2 device continues to flood to the set of output ports all subsequent network traffic bound for the destination address until the L2 device receives some network traffic originated from the address, at which time the L2 device is able to "learn" the specific port by which the L2 address is reachable. As a result, the L2 device forwards future network traffic bound for the address to the particular output port and no longer needs to flood the network traffic.

In this way, L2 network devices rely on network traffic flooding to ensure that L2 traffic reaches its destination. However, the use of network flooding requires that the L2 devices operate to reduce or eliminate any "data loops" in the L2 network, i.e., situations where network traffic is flooded in a manner that results in the flooding device subsequently receiving the same traffic that was flooded by the flooding device. As one example, an L2 network in which multiple links exist between devices or in which the devices are coupled in a ring topology may suffer from data loops. The presence of such a data loop may have severe adverse affects on a L2 network. For example, a data loop may result in consumption of significant bandwidth and resources as the flooded traffic within the data loop is continuously flooded by the devices. Moreover, a data loop may also result in the final destination receiving multiple copies of the same packet.

Thus, it is often necessary to eliminate data loops from the L2 network topology. One typical approach in addressing data loops is to for the L2 devices to coordinate and construct a shortest path bridging (SPB) tree to represent the L2 network. L2 devices with the network, such as Ethernet bridges, share information and eliminate loops by reducing the L2 network to a one or more SPB trees, each having a single path between end stations. The L2 devices utilize the agreed-upon SPB trees to control forwarding of data within the L2 network, thereby avoiding data loops.

SUMMARY

In general, the invention involves techniques for computing forwarding information for L2 devices within an L2 network. Each of the L2 devices within the L2 network may compute multiple trees for distribution of traffic within the L2 network and generate forwarding information based on the distribution trees. As one example, each of the L2 devices may compute multiple shortest path bridging (SPB) trees representing the L2 network, where each of the trees computed by a device is constructed using a different one of the L2 devices as a root node. Moreover, as described herein, each L2 device need not compute a corresponding tree for each of the nodes of the L2 network other than the respective L2 device. That is, for an L2 network comprising N nodes, a given one of the L2 devices need not compute N trees each having a different one of the nodes as a root node. Instead, each of the L2 devices may compute a small subset of the trees. Nevertheless, as discussed herein, each of the L2 devices is able to compute forwarding information including flooding next hops based on the reduced set of trees.

In one embodiment, a method comprises determining a plurality of tree identifiers for trees to be used to control distribution of layer two (L2) communications within an L2 network having a plurality of L2 devices, wherein each of the plurality of L2 devices corresponds to a different one of the tree identifiers. With a first one of the L2 devices, the trees are computed for a subset of less than all of the tree identifiers without computing the trees for the remaining tree identifiers. With the first one of the L2 devices, flooding next hops are computed for all of the tree identifiers for the L2 devices of the L2 network using the subset of the of the trees, wherein each of the flooding next hops identifies a set of the L2 devices within the L2 network to which to the forward L2 communications. The L2 communications are forwarded in according with the flooding next hops.

In an additional embodiment, a device comprises one or more network interfaces to receive layer two (L2) communications from an L2 network having a plurality of L2 devices; and a control unit to forward the L2 communications in accordance with forwarding information defining a plurality of flooding next hops. Each of the flooding next hops stored by the control unit specifies a set of the L2 devices within the L2 network to which to forward L2 communications in accordance with a plurality of trees. The control unit computes a corresponding one of flooding next hops for each of the plurality of trees using only a subset of the trees without computing trees for each of the L2 network devices.

The techniques of the invention may provide one or more advantages. For example, unlike L2 networks that utilize a single tree to control distribution, the techniques described herein allow L2 devices to calculate pair-wise optimal flooding next hops. Moreover, the techniques allow each of the L2 devices to compute forwarding information, including the pair-wise optimal flooding next hops, without necessarily computing a full set of trees for the L2 network. That is, for an L2 network comprising N L2 devices, the L2 devices can determine flooding next hops that achieve pair-wise optimal forwarding without each of the L2 devices having to compute N trees, where each of the N trees have a different one of the nodes as a root node. The techniques may provide a more scalable and robust solution to calculation of forwarding information. For example, in a network having 100 L2 devices, an L2 device need not compute 100 trees, but instead calculates a greatly reduced set of trees (e.g., two or three trees) representing itself and its immediate neighboring devices as root nodes. The technique described herein may provide increased scalability in that the number of trees computed by an individual node need not increase as L2 devices are added to the network. Moreover, the techniques described herein may allow L2 devices to provide reduced response time to topology changes and increased resiliency to routing flaps since each device need only compute a reduced number of trees.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 4A-4D are graphs that illustrate a set of four trees computed by a network device of the L2 network of FIG. 1 in accordance with the principles of the invention.

DETAILED DESCRIPTION

Figure 1:
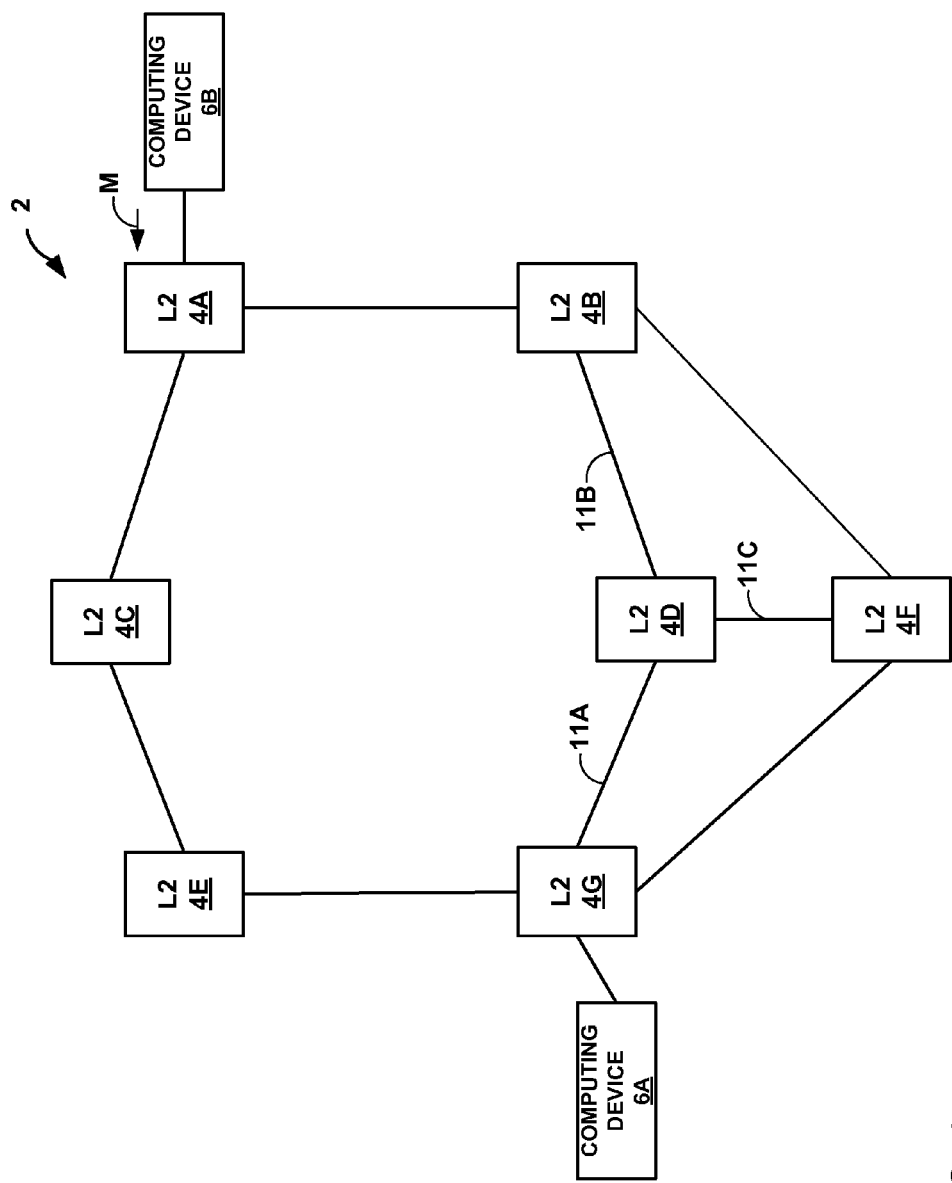
FIG. 1 is a block diagram illustrating an example layer two (L2) network.

FIG. 1 is a block diagram illustrating an example network environment 2 in which a set of layer two (L2) network device 4A-4G (collectively, "L2 devices 4") provide L2 services. In particular, in this example, L2 devices 4 provide local area network (LAN) services for customer devices 6A and 6B. That is, computing devices 6 source and receive L2 network traffic by way of L2 devices 4. For example, L2 devices 4 may be a collection of Ethernet switches or bridges that transparently operate as an Ethernet network to provide L2 connectivity between devices 6. Further, although shown and described as providing L2 services, each of L2 devices 4 may be any network element that provides services for other layers of the network stack. As one example, L2 devices 4 may be network routers that integrate L2/L3 services so as to provide layer 3 (L3) routing functions as well as L2 forwarding services. Although described, with respect to Ethernet, L2 devices 4 may apply the techniques described herein to other forms of L2 communications. Examples of customer devices 6A and 6B include end-user computers, printers, servers, gateways, firewalls, virtual private network (VPN) appliances, intrusion detection and prevention (IDP) devices and the like. Moreover, although shown for exemplary purposes with respect to two customer devices 6A and 6B, L2 devices 4 typically provide connectivity to numerous devices.

When forwarding L2 traffic, L2 devices 4 perform media access controller (MAC) learning which allows each of the L2 devices to dynamically learn and record the MAC addresses associated with each of its network interface ports. For example, upon receiving L2 communications (e.g., an Ethernet frames) to be forwarded, L2 devices 4 flood the L2 communications to all network links except the links on which the communications were received. L2 devices 4, however, record the source MAC addresses for the communications as well as the interface ports on which the communications were received. This allows each L2 device 4 to "learn" the specific interface port by which each MAC address is reachable. Upon receiving subsequent L2 communications for destined for learned MAC addresses, L2 devices output the L2 communications to the specific ports by which the destinations are reachable, thereby avoiding flooding the network traffic and unnecessarily consuming network bandwidth. L2 communications that are flooded in this way may be referred to as "BUM" traffic, i.e., where the traffic is either "Broadcast" traffic, "Unknown" unicast traffic (i.e., not yet learned), or "Multicast" traffic.

As shown in the example of FIG. 1, L2 devices 4 may be configured in a topology having redundant paths and may be organized in a ring topology. For example, network 2 may be a metropolitan or campus ring network having a plurality of Ethernet switches and bridges. As described herein, in one example each of L2 devices 4 computes multiple shortest path bridging (SPB) trees that the L2 device uses to control the distribution of L2 traffic within the L2 network. For example, L2 network devices 4 may exchange information and individually compute agreed-upon SPB trees to represent the L2 network, thereby avoiding data loops. Such computations may be based on costs or other metrics associated with the individual links interconnecting L2 network devices 4. Further, each of the L2 devices compute multiple SPB trees for the L2 network 2 and avoids the limitations associated with use of a single tree for the L2 network 2. For example, each of L2 devices 4 may compute multiple SPB trees representing the L2 network, where each of the trees computed by a given one of the L2 devices is constructed using a different one of the L2 devices as a root node. Moreover, as described herein, each of L2 devices 4 need not compute a corresponding tree for all of the other nodes 4A-4G of the L2 network. That is, for the example L2 network 2 of FIG. 1 comprising G nodes (4A-4G), each of the L2 devices 4A-4G need not compute G trees, each of the trees having a different one of the nodes as a root node, in order to achieve optimal, shortest path forwarding between all pairs of devices. Instead, each of L2 devices 4 may compute only a subset of the G trees and still compute forwarding information in order to achieve optimal, shortest path forwarding between all pairs of device. The term "tree" is used herein to refer to any data structure that represents the network as a tree-like structure or graph having a root node and additional nodes, where only one path exists between any pair of the nodes (i.e., no loops). Example details are described in the ANSI/IEEE Std 802.1D, LAN/MAN Standards Committee of the IEEE Computer Society, ed. (1990) and the ANSI/IEEE Std 802.1D-2004: IEEE Standard for Local and Metropolitan Area Networks: Media Access Control (MAC) Bridges, LAN/MAN Standards Committee of the IEEE Computer Society, ed. (2004), the entire contents of both of which being hereby incorporated herein by reference.

As one example, L2 devices may form a type of L2 network referred to as a "Transparent Interconnection of Lots of Links" ("TRILL") network currently being proposed by the Internet Engineering Task Force (IETF). As a TRILL network, L2 traffic forwarded by L2 devices 4A-4G may include an additional TRILL header specifying a tree identifier ("tree ID") that specifies a tree to be used when forward the traffic. In this manner, the TRILL network seeks to ensure optimal pair-wise shortest path when forwarding traffic by assuming that each of the L2 devices have computed a complete set of trees (e.g., G SPB trees for FIG. 1), where any of the trees can be specified within the TRILL headers of the L2 communication. However, in accordance with the principles, each of L2 devices 4 compute less than all the trees but nevertheless generate forwarding information (e.g., flooding next hops) for all of the tree identifiers. L2 devices 4 may then program internal forwarding components with the flooding next hops and associated tree identifiers based on the reduced set of trees. Upon receiving L2 communications, the internal forwarding components select the appropriate next hops to which to forward the L2 communications based on the tree identifier carried within the TRILL headers of the L2 communications. In this way, L2 devices 4 may achieve pair-wise optimal forwarding without each of the L2 devices having to compute G trees, where each of the G trees have a different one of the L2 devices 4A-4G as a root node.

As one example, at some point L2 device 4D may receive an L2 communication M that originated at customer device 6B and is destined for customer device 6A. Moreover, L2 communication M carries an additional TRILL header introduced by L2 device 4A that operated as an ingress for the L2 communication into the TRILL network. The TRILL header carries an identifier associated with L2 device 4A. When forwarding the L2 communication M, L2 device 4D processes and forwards the L2 communication by selecting a set of flooding next hops for the communication based on the tree ID carried within the TRILL header of the communication. For example, upon receiving the L2 communication M, L2 device 4D selects a set of flooding next hops that were computed for a tree ID for which L2 device 4A is the root. This allows L2 devices 4 to forward L2 communication M through L2 network 2 according to pair-wise optimal shortest paths. However, in accordance with the principles, L2 device 4D, for example, computes less than all the trees but nevertheless generate forwarding information (e.g., flooding next hops) for all of the tree identifiers for all of devices 4A-4G.

The techniques may provide a more scalable and robust solution to calculation of forwarding information. For example, in the network of FIG. 1 having seven L2 devices 4A-4G, each L2 device need not compute seven (7) trees but instead calculates a reduced set of trees (e.g., two or three trees) representing itself and its immediate neighboring devices as root nodes. For example, L2 device 4D only computes four trees, yet, from the reduced set of trees, L2 device 4D is able to compute forwarding information for all seven possible tree identifiers A-G In this way, the technique described herein may provide increased scalability in that the number of trees computed by an individual node, in that the number of trees computed need not increase as L2 devices 4 are added to L2 network 2. Moreover, the techniques described herein may allow L2 devices 4 to provide reduced response time to topology changes of L2 network 4 and increased resiliency to routing flaps since each device need only compute a reduced number of trees.

Figure 2:
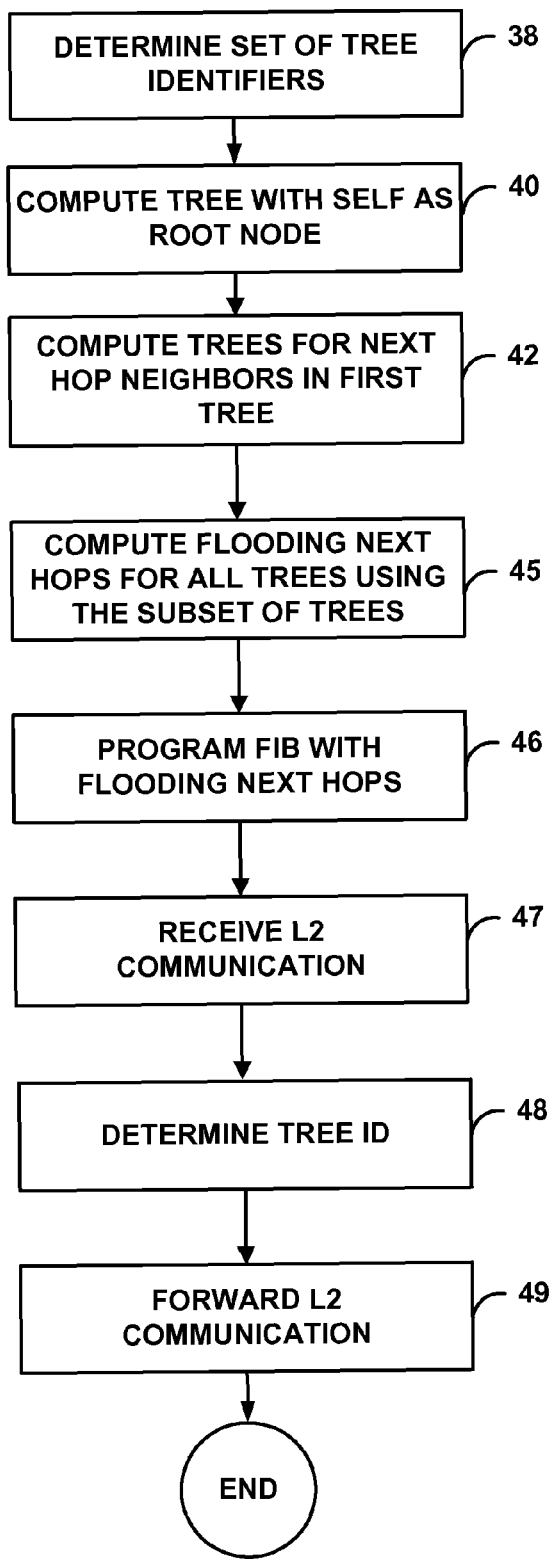
FIGS. 2 and 3 are flowcharts illustrating exemplary operation of a device in accordance with the principles of the invention.
Figure 3:
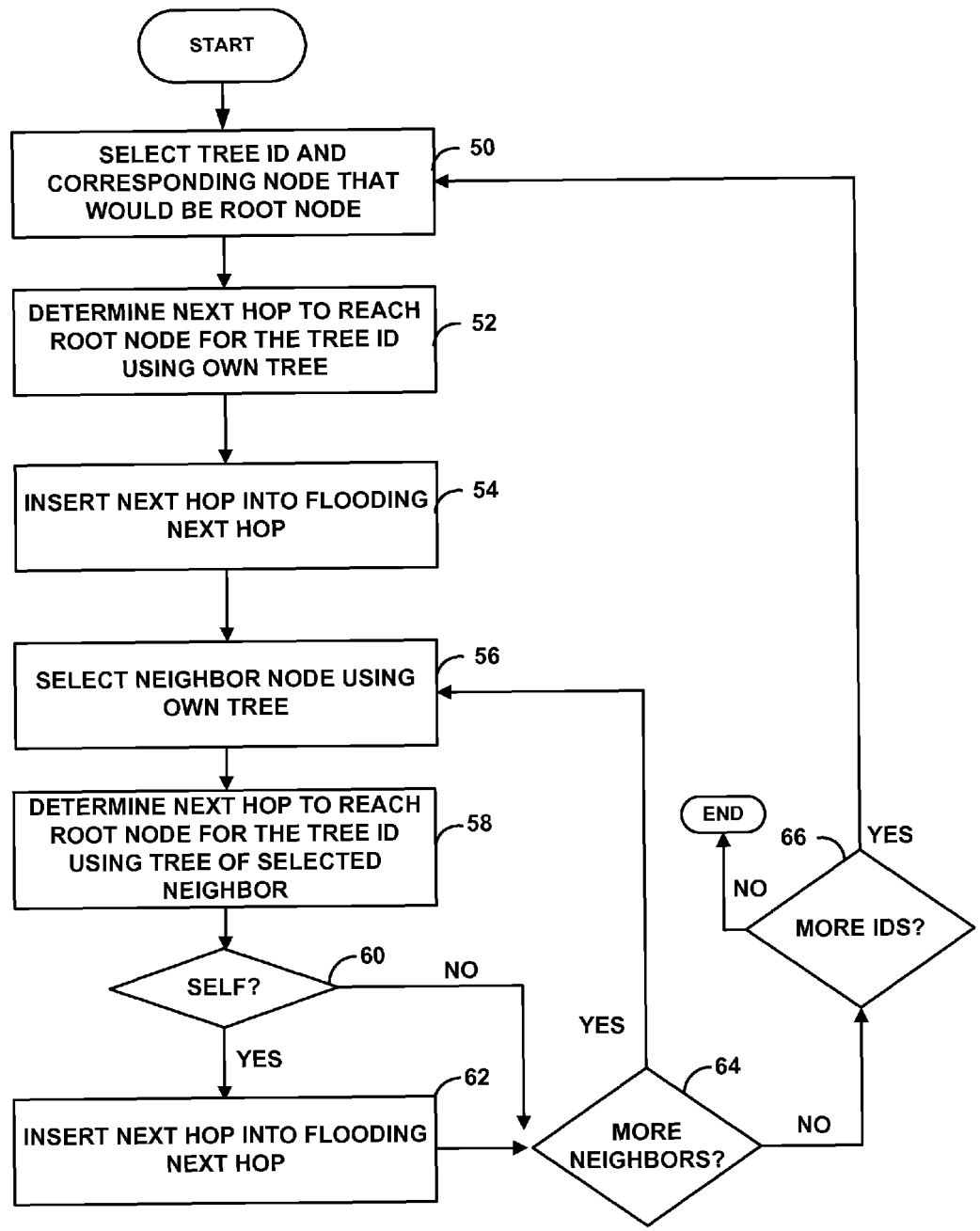

FIGS. 2 and 3 are flowcharts illustrating exemplary operation of a device in accordance with the principles of the invention. For exemplary purposes, the flowcharts of FIGS. 2 and 3 will be described in reference to trees 20A-20D shown in FIGS. 4A-4D.

Initially, L2 device 4D determines a complete set of tree identifiers (38). For example, L2 device 4D may communicate with the other L2 devices 4 to determine a mutually agreed-upon set of tree identifiers for the complete set of possible trees. With respect to FIG. 1, L2 devices 4 may agree upon tree identifiers A-G, for example, for the seven trees that would be necessary to ensure that each tree has a different root node.

Next, L2 device 4D calculates the tree 20A (FIG. 4A) having itself as the root node (40). Next, L2 device 4D calculates trees 20B-20D (FIGS. 4B-4D) that utilize the immediate neighbors of L2 device 4D as root nodes (42). As shown, each of trees 20A-20D is computed using a different root node and reduces L2 network 2 to a tree topology with no data loops. Thus, L2 device 4D computes less than a complete set of trees, which in this example would require seven trees that each have a different one of the L2 devices 4A-4G as a root node. Instead, L2 device 4D computes only the four trees 20A-20D, where the reduced set of trees includes a tree having itself as the root node and trees having each of the immediate neighbors of L2 device 4D as root nodes.

Despite the fact that L2 device 4D computes less than a complete set of trees, as further discussed below, L2 device 4D computes forwarding information (e.g., flooding next hops) for all of the tree identifiers for the complete set of trees in which each of L2 devices 4A-4G would have been represented as a root node (45).

L2 device 4D programs internal forwarding components with the flooding next hops and associated tree identifiers based on the reduced set of trees 20A-20D (46). For example, L2 device 4D may program an internal forwarding information base (FIB) of a forwarding engine.

Upon receiving L2 communications (47), L2 device 4D may determine a tree identifier to be used when forwarding the communication (48). For example, in TRILL networks, L2 device 4D examines a TRILL header that was added to the L2 communication by the L2 device 4 that operated as an ingress for the L2 communication. L2 device 4D extracts a tree identifier from the TRILL header. As another example, L2 network 2 conforms to the 802.1aq standard currently being developed by the Institute of Electrical and Electronics Engineers (IEEE).

Based on the tree identifier, L2 device 4D performs a forwarding lookup into the forwarding information using the tree ID and selects the appropriate next hops to which to flood the L2 communications. L2 device 4D then floods the L2 communication to the next hops specified by the forwarding information (49). In this way, L2 device 4D may achieve pair-wise optimal forwarding using forwarding information having flooding information for all possible tree identifiers without having to compute the complete set of trees for the L2 network.

FIG. 3 is a flowchart illustrating in further detail a process for computing forwarding information using a reduced set of trees. In particular, the flowchart of FIG. 3 illustrates exemplary techniques by which an L2 device (e.g., L2 device 4D of FIG. 1) computes flooding next hops for all possible tree identifiers of an L2 network using only a reduced set of trees, such as trees 20A-20D of FIGS. 4A-4D.

For its own tree identifier, the L2 device computes the flooding next hop by executing the shortest path first (SPF) calculation using itself as the root node of the tree. For example, L2 device 4D generates the flooding next hop information for the tree having an identifier of "D" (i.e., itself as root) as {4B, 4F, 4G}. Next, the L2 device loops through each of the other tree identifiers and computes the flooding next hops for each tree identifier using only the reduced set of trees in accordance with the flowchart of FIG. 3.

For example, L2 device 4D may then initially select the first tree identifier for the remaining trees (50). For example, L2 device 4D may select "A" as the first tree identifier from the mutually agreed upon set of identifiers "A-G," where the identifier A is associated with the tree for which L2 device 4A is the root node. Next, instead of referring to the tree that corresponds to this identifier, L2 device 4D instead looks to own tree for which L2 device 4D is the root (i.e., tree 20A of FIG. 4A which would have a tree ID of "D"). Using its own tree, L2 device 4D determines the next hop to reach the root node of the tree for which forwarding information is being generated. In other words, using tree 20A, L2 device determines the next hop to reach L2 device 4A, which is the root node for the tree having an identifier of "A." In this example, the next hop shown in tree 20A from node 4D to reach node 4A is node 4B. Having determined this next hop using its own tree, L2 device 4D initializes the flooding information for tree identifier "A" to by inserting the next hop {4B} into the flooding next hop (54). As the paths of the L2 network in the complete set of trees are symmetric, because tree 20A indicates that node 4D reaches node 4A through node 4B, then the converse is also true. That is, due to this symmetric nature, node 4A reaches node 4D through node 4B.

Next, L2 device 4D examines the trees it computed having its own neighbors as roots to determine whether any additional next hops need to be inserted into the flooding next hop being constructed for the current tree identifier (56). That is, L2 device 4D examines its own tree 20A and determines the L2 devices that are neighbors to L2 device 4D in the tree. In this example, L2 device 4D has three neighbors: 4B, 4F and 4G. L2 device 4D then examines the trees of these neighbors. For example, L2 device 4D first examines tree 20B having neighboring L2 device 4B as the root node. Specifically, L2 device 4D determines whether neighboring node 4B reaches node 4A though L2 device 4D (58). That is, L2 device 4D looks to the tree for its neighbor to determine whether, according to that tree, the neighbor node reaches the root node for the tree of the current ID (tree ID "A" having a root node 4A in this case). In this case, it does not (NO of 60), so the neighboring node 4B is not added to the flooding next hop being constructed for tree identifier "A."

If additional neighbors exist (YES of 64), L2 device 4D repeats this process for the next neighbor. In this example, L2 device 4D examines tree 20C having neighboring L2 device 4F as the root node. L2 device 4D determines whether neighboring node 4F reaches node 4A though L2 device 4D (58). Again, in this case, it does not and the neighboring node 4F is not added to the flooding next hop being constructed for tree identifier "A."

L2 device 4D repeats this process a third time by examining tree 20D having neighboring L2 device 4G as the root node. L2 device 4D determines whether neighboring node 4G reaches node 4A though L2 device 4D (58). In this case, the tree 20D indicates that L2 device 4G will reach node 4A through node 4D (YES of 60), causing L2 device 4D to insert next hop 4G into the flooding next hop being constructed for tree identifier "A" (62). Thus, the flooding next hop computed by L2 device 4B to be used for network traffic having a header identifying tree ID "A" is the specific set of next hops {4B, 4G} to which traffic is to be flooded. When flooding BUM traffic having a tree identifier "A," L2 device 4B would thus flood the traffic to neighboring L2 devices 4B and 4G.

L2 device 4D then selects the next tree identifier and repeats the process until flooding next hops have been computed for all tree identifiers of the complete set (NO of 66). Continuing with this example, L2 device 4D would then select a tree identifier "B" and compute the flooding next hop as previously described. This process continues until L2 device 4D has computed flooding next hops for all tree identifiers A-G using only the reduced set of trees 20A-20D.

Figure 5:
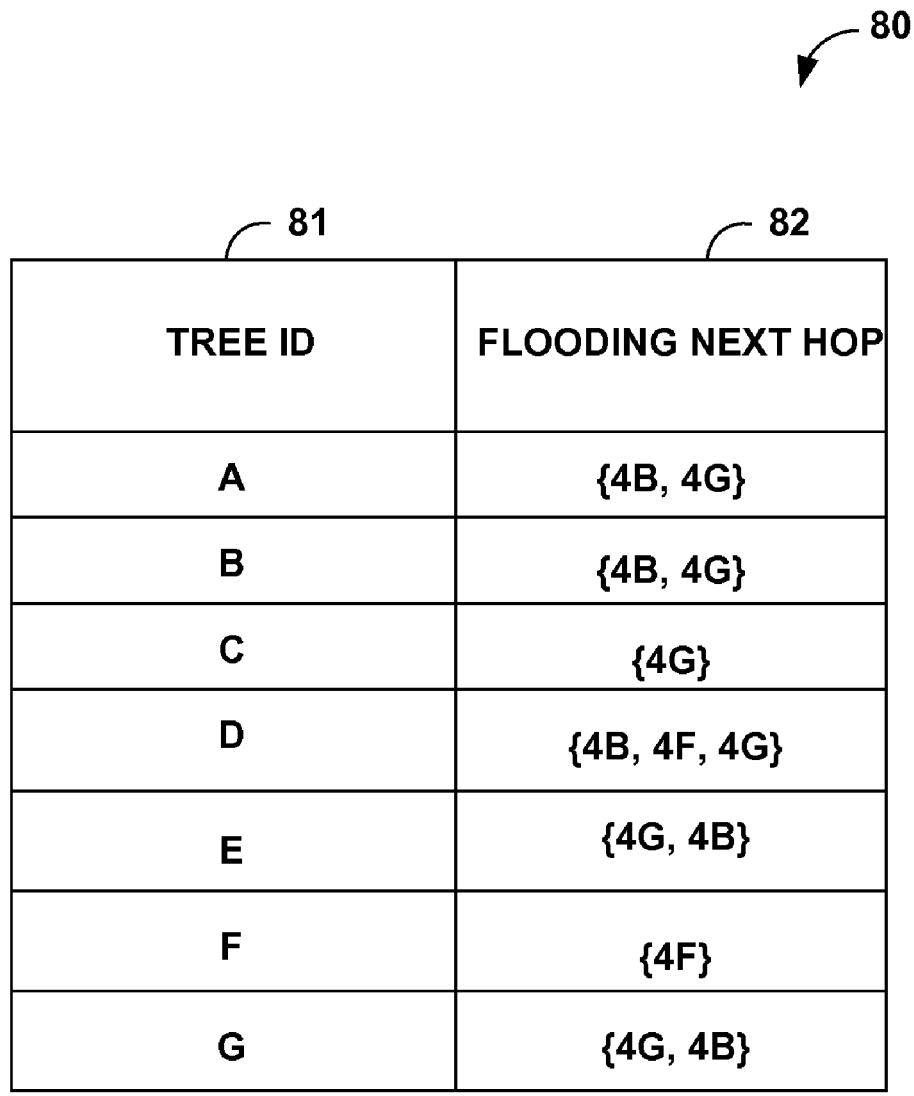
FIG. 5 illustrates an exemplary data structure storing complete flooding next hops computed by an L2 device for all tree identifiers for an L2 network using only the reduced set of trees.

FIG. 5 illustrates an exemplary data structure 80 storing complete flooding next hops computed by L2 device 4D for all tree identifiers A-G using only the reduced set of trees 20A-20D. That is, data structure 80 represents forwarding information that may be programmed into an internal forwarding component of L2 device 4D to specify flooding next hops 82 and associated tree identifiers 81 computed from the reduced set of trees 20A-20D. Upon receiving L2 communications, the internal forwarding component of L2 device 4D identifies the tree identifier carried by the L2 communication and uses the tree identifier to select one of the flooding next hops 82. L2 devices then floods the L2 communications to all of the individual next hops specified within the selected flooding next hop except the next hop from which the L2 communication was received. For example, if L2 device 4D receives an L2 communications from L2 device 4B having a tree ID of "A," then L2 device 4D floods a copy of the L2 communication to next hop L2 device 4G. Although in this example, each of flooding next hops 82 contains only a few hops to which to flood BUM traffic, in larger networks the flooding next hops may specify numerous next hops to which to flood the L2 communication. Moreover, in larger networks the number of tree IDs may be hundreds or thousands. Nevertheless, as described herein, L2 devices are able to compute flooding next hops for all of the possible trees using a significantly reduced set of the trees.

Figure 6:
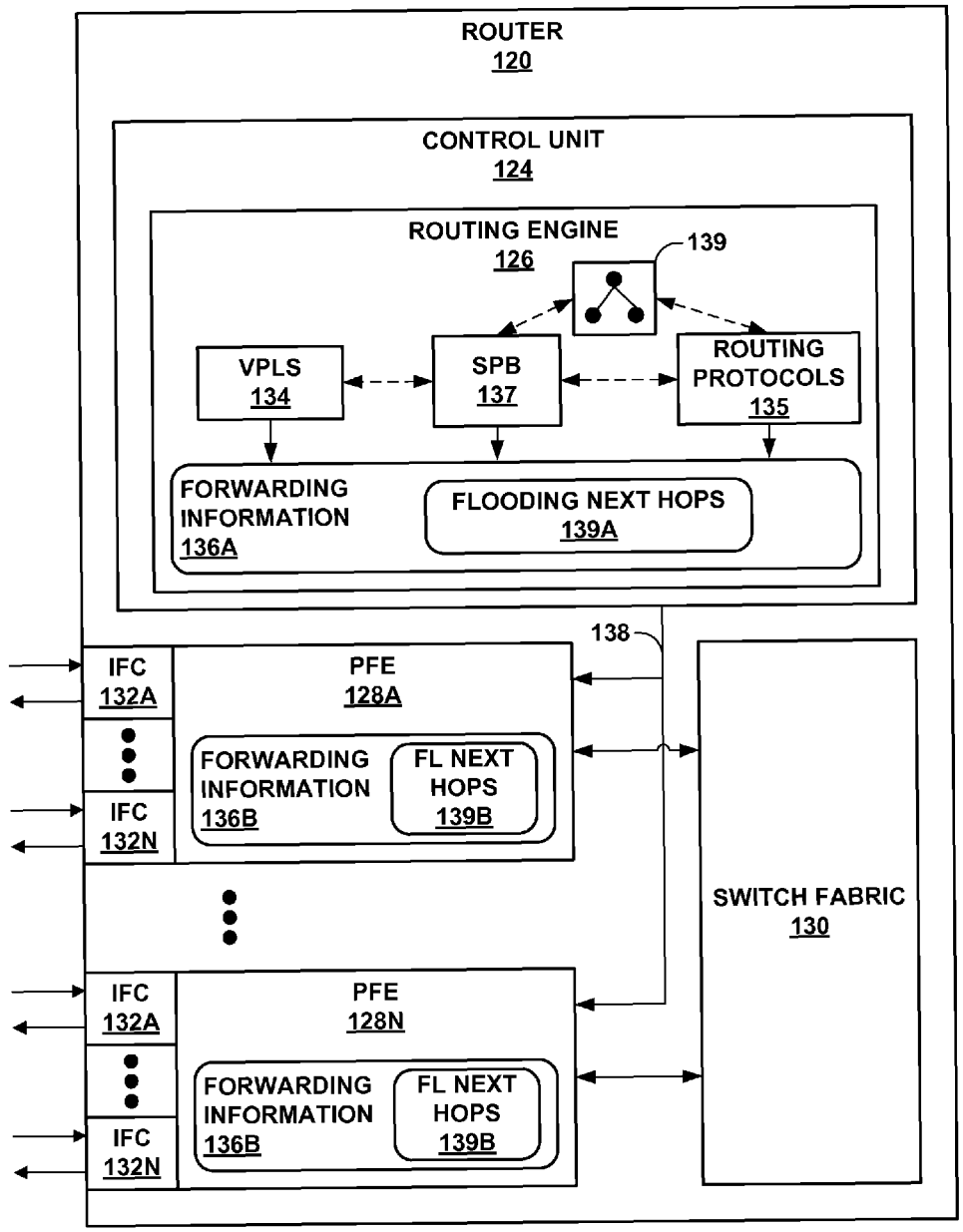
FIG. 6 is a block diagram illustrating an exemplary embodiment of a router that integrates L2/L3 services so as to provide L3 routing functions as well as L2 forwarding services.

FIG. 6 is a block diagram illustrating an exemplary embodiment of a router 120 that integrates L2/L3 services so as to provide layer three (L3) routing functions as well as L2 forwarding services. Router 120 may be used, for example, in a L3 network used as an intermediate transport network between two or more L2 networks in order to allow communication between the L2 networks. In this type of configuration, router 120 and other routers of the L3 network transparently transports L2 communications between the L2 networks, thereby allowing the L2 networks to share an L2 service. Common protocols for transporting the L2 communications through the intermediate L3 network are label switching protocols, such as Multi-protocol Label Switching (MPLS) protocols, Resource Reservation Protocol (RSVP) and the Label Distribution Protocol (LDP). A source device, such as a router connected to one of the L2 networks, can request a path through the intermediate network. For example, with MPLS, this path is referred to as a Label Switched Path (LSP), and defines a distinct, dedicated, and guaranteed path through the network to carry MPLS packets from the source to the destination. The MPLS packets encapsulate the L2 communications, thereby effectively shielding the L3 network from the transported L2 information.

In one example, router 120 executes the Virtual Private LAN Service (VPLS), also referred to as Point-to-multipoint (P2MP) L2 Virtual Private Networks (VPNs). In general, VPLS allows two or more remote customer networks to be transparently connected through the intermediate network as if the intermediate network does not exist from the perspectives of the customer networks. In particular, L2 communications, such as Ethernet packets, are transported between customer networks via the intermediate network. In a typical configuration, router 120 and other VPLS-enabled routers that are associated with the customer networks define LSPs within the intermediate network to carry encapsulated L2 communications as if these customer networks were directly attached to the same Local Area Network (LAN). To properly communicate via these LSPs, router 120 and the other VPLS-enabled routers stores L2 information, such as Media Access Control (MAC) addresses, as well as VPLS information, such as local and remote VPLS site information. In this manner, these VPLS-enabled routers provide transparent L2 connectivity across the intermediate network and simulate a direct LAN.

In the exemplary embodiment illustrated in FIG. 2, router 120 is a VPLS-enabled L3/L2 device that includes a control unit 124 having a routing engine 126. PE router 120 also includes a plurality of packet forwarding engines (PFEs) 128A-128N ("PFEs 218") and a switch fabric 130. PFEs 128 may each receive and send data packets via interface cards 32A-32N ("IFCs 132"). In other embodiments, each of PFEs 128 may comprise more or fewer IFCs 132 and even though FIG. 2 may suggest that each of PFEs 128 comprise the same number of IFCs 132, each PFE 28 may comprise a different number of IFCs 132. Switch fabric 130 forwards incoming data packets to the correct one of PFEs 128 for transmission over a network, such as SP network 14.

Generally, routing engine 126 maintains routing tables, executes routing protocols and controls user access to routing engine 126. Routing engine 126, as shown in FIG. 6, includes a plurality of executable software modules, VPLS module 134 ("VPLS 134"), SPB tree module 137 ("SPB 137") and routing protocols module 135 ("protocols 135"). VPLS module 134 represents software that implements the VPLS protocol described above that routine engine 126 executes to support VPLS 134. Routing protocols 135 represents various routing protocols and/or signaling protocols, such as a label distribution protocol (LDP), Open Shortest Path First (OSPF), Intermediate system to intermediate system (IS-IS), or the border gateway protocol (BGP), that routing engine 126 may execute to determine the current topology of SP network 14 and/or signal paths within the current topology respectively.

SPB module 137 represents software that exchanges information with other VPLS-enabled devices and construct a reduced set of shortest-path bridging (SPB) trees 139 in accordance with the techniques described herein. That is, SPB 137 may interact with VPLS 134 when router 120 provides L2 VPLS services to compute trees for other L2 devices. Moreover, SPB 137 computes a reduced set of SPB trees rather than compute a tree for all L2 devices of the network. VPLS 134 or any of protocols 135 may, after determining the network topology, resolve the network topology into forwarding information 136A. As shown, VPLS 134 or routing protocols 135 generate forwarding information 136A to include flooding next hops 139A based on the reduced set of trees 139 in accordance with the techniques described herein.

Routing engine 126 loads a copy of or a subset of forwarding information 136A into to each of PFEs 128 via a dedicated link 38. The loading of forwarding information 136A is represented in FIG. 6 by forwarding information 136B included within each of PFEs 128. The loading may not necessarily proceed by completely replacing any prior forwarding information 136B with newly resolved forwarding information 136A, but instead may involve routing engine 126 outputting a series of update messages to update forwarding information 136B within PFEs 128 to reflect any changes between previous and recently resolved forwarding information 136B, 38A respectively. Thus, forwarding information 136B may be either "loaded" or "updated" within PFEs 128, and each term may be used herein interchangeably.

The architecture of router 120 illustrated in FIG. 6 is shown for exemplary purposes only. The disclosure is not limited to this architecture. In other embodiments, router 120 may be configured in a variety of ways. In one embodiment, for example, some of the functionally of routing engine 126 and packet forwarding engine 128 may be distributed within IFCs 132.

Elements of control unit 124 may be implemented solely in software, or hardware, or may be implemented as combinations of software, hardware, or firmware. For example, control unit 124 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 124 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 120, e.g., protocols. Control unit 124, in some examples, retrieves and executes the instructions from memory for these aspects.

Various embodiments of the invention have been described. These and other embodiments are within the scope of the following claims.

The invention claimed is:

1. A method comprising:
   determining a plurality of tree identifiers for trees to be used to control distribution of layer two (L2) communications within an L2 network having a plurality of L2 devices, wherein each of the plurality of L2 devices corresponds to a different one of the tree identifiers;
   computing, with a first one of the L2 devices, the trees for a subset of the tree identifiers without computing the trees for the remaining tree identifiers;
   computing, with the first one of the L2 devices, flooding next hops for all of the tree identifiers for the L2 devices of the L2 network using the subset of the of the trees, wherein each of the flooding next hops identifies a set of the L2 devices within the L2 network to which to the forward L2 communications; and
   forwarding, with the first one of the L2 devices, the L2 communications in according with the flooding next hops.

2. The method of claim 1, further comprising installing the flooding next hops into a forwarding component of the first one of the L2 devices.

3. The method of claim 1, wherein the first one the L2 device comprises a router that provides a routing engine and a packet forwarding engine, the method further comprising installing the flooding next hops from the routing engine into the packet forwarding engine of the first one of the L2 devices.

4. The method of claim 1, wherein computing the trees for a subset of less than all of the tree identifiers without computing the trees for the remaining tree identifiers comprises:
   computing a tree having the first one of the L2 devices as a root node;
   determining a set of the L2 devices that are neighbors to the first one of the L2 devices according to the tree having the first one of the L2 devices as the root node; and
   computing a corresponding tree for each of the L2 devices determined to be a neighbor of the first one of the L2 devices.

5. The method of claim 1, wherein computing flooding next hops comprises:
- selecting each of the tree identifiers;
- for each of the selected tree identifiers:
  - determining a corresponding one of the L2 devices with which the selected tree identifier is associated;
  - using the tree computed for the first one of the L2 devices, determining one of the L2 devices that is a next hop to reach the L2 device that corresponds to the selected tree identifier and insert the determined L2 device into the flooding next hop for the selected tree identifier; and
  - for each of the trees computed for the L2 devices that is neighbor of the first one of the L2 devices according to the tree for the first one of the L2 devices, determining one of the L2 devices that is a next hop to reach the L2 device corresponding to the selected tree identifier and insert the determined L2 device into the flooding next hop for the tree identifier.

6. The method of claim 1, wherein forwarding the L2 communications in according with the flooding next hops comprises:
- receiving one of the L2 communications with the first one of the L2 devices;
- selecting one of the flooding next hops based on a tree identifier within a header of the received L2 communication; and
- flooding copies of the L2 communication to the set of L2 devices identified by the selected flooding next hop.

7. The method of claim 1, wherein the L2 network comprises a Transparent Interconnection of Lots of Links (TRILL) network or an IEEE 802.1aq network.

8. A device comprising:
- one or more network interfaces to receive layer two (L2) communications from an L2 network having a plurality of L2 devices; and
- a control unit to forward the L2 communications in accordance with forwarding information defining a plurality of flooding next hops,
- wherein each of the flooding next hops specifies a set of the L2 devices within the L2 network to which to forward L2 communications in accordance with a plurality of trees, and
- wherein the control unit computes a corresponding one of flooding next hops for each of the plurality of trees using only a subset of the trees without computing trees for each of the L2 network devices.

9. The device of claim 8,
- wherein the plurality of trees includes a tree for each of the L2 devices, and
- wherein each of the trees has a different one of the plurality of L2 devices as a root node.

10. The device of claim 9,
- wherein each of the trees is associated with a different tree identifier,
- wherein the control unit computes the flooding next hops for all of the tree identifiers for the L2 devices of the L2 network using the subset of the trees without computing trees for each of the L2 network devices as different root nodes.

11. The device of claim 10, wherein the control unit computes flooding next hops by:
- selecting each of the tree identifiers;
- for each of the selected tree identifiers:
  - determining a corresponding one of the L2 devices with which the selected tree identifier is associated;
  - using the tree computed for the first one of the L2 devices, determining one of the L2 devices that is a next hop to reach the L2 device corresponding to the selected tree identifier and insert the determined L2 device into the flooding next hop for the selected tree identifier; and
  - for each of the trees computed for the L2 devices that is neighbor of the first one of the L2 devices according to the tree for the first one of the L2 devices, determining one of the L2 devices that is a next hop to reach the L2 device corresponding to the selected tree identifier and insert the determined L2 device into the flooding next hop for the tree identifier.

12. The device of claim 8,
- wherein the control unit computes the subset of the trees to include only a tree having the device as a root node and a trees for each of the L2 devices that next hop neighbor to the device according to the tree having device as the root node.

13. The device of claim 8,
- wherein the L2 communications include headers specifying tree identifiers; and
- wherein the control unit forwards each of the L2 communications by selecting one of the flooding next hops based on the tree identifier within the header of the received L2 communication and flooding copies of the L2 communication to the set of L2 devices identified by the selected flooding next hop.

14. The device of claim 8, wherein the L2 network comprises a Transparent Interconnection of Lots of Links (TRILL) network or an IEEE 802.1aq network.

15. The device of claim 8, further comprising:
- a tree protocol (STP) module that computes the subset of the trees; and
- a virtual private LAN service (VPLS) module that forms a virtual network, and
- wherein the VPLS module computes the flooding next hops.

16. The device of claim 8, wherein the device comprises an L2 switch or a router.

17. A computer-readable storage comprising instructions that cause a programmable processor to:
- determine a plurality of tree identifiers for trees to be used to control distribution of layer two (L2) communications within an L2 network having a plurality of L2 devices, wherein each of the plurality of L2 devices corresponds to a different one of the tree identifiers;
- compute, with a first one of the L2 devices, the trees for a subset of less than all of the tree identifiers without computing the trees for the remaining tree identifiers;
- compute, with the first one of the L2 devices, flooding next hops for all of the tree identifiers for the L2 devices of the L2 network using the subset of the of the trees, wherein each of the flooding next hops identifies a set of the L2 devices within the L2 network to which to the forward L2 communications; and
- programming a forwarding component of the first one of the L2 devices to forward the L2 communications in according with the flooding next hops.

* * * * *